United States Patent
Oltman et al.

(10) Patent No.: US 10,246,116 B2
(45) Date of Patent: Apr. 2, 2019

(54) MULTIPURPOSE UTILITY CARTS

(71) Applicant: Rubbermaid Commercial Products LLC, Atlanta, GA (US)

(72) Inventors: William Oltman, Grand Rapids, MI (US); Jeffrey Stark, Brackhill, NC (US); Jeffrey Bertucci, Denver, NC (US)

(73) Assignee: Rubbermaid Commercial Products LLC, Atlanta, GA (US)

( * ) Notice: Subject to any disclaimer, the term of this patent is extended or adjusted under 35 U.S.C. 154(b) by 0 days.

(21) Appl. No.: 15/792,110

(22) Filed: Oct. 24, 2017

(65) Prior Publication Data

US 2018/0111635 A1  Apr. 26, 2018

Related U.S. Application Data

(60) Provisional application No. 62/412,737, filed on Oct. 25, 2016.

(51) Int. Cl.
| | |
|---|---|
| *B62B 3/04* | (2006.01) |
| *B62B 5/06* | (2006.01) |
| *B25H 3/00* | (2006.01) |
| *B62B 3/10* | (2006.01) |

(52) U.S. Cl.
CPC ............... *B62B 3/04* (2013.01); *B25H 3/00* (2013.01); *B62B 3/10* (2013.01); *B62B 5/06* (2013.01); *B62B 5/064* (2013.01); *B62B 2202/48* (2013.01)

(58) Field of Classification Search
CPC ......... B62B 5/067; B62B 5/064; B62B 3/002; B62B 3/005; B62B 3/1472

USPC ............................................ 280/47.35, 655.1
See application file for complete search history.

(56) References Cited

U.S. PATENT DOCUMENTS

| | | | | | |
|---|---|---|---|---|---|
| 2,525,208 | A | * | 10/1950 | Clink ...................... | B25H 1/12 206/373 |
| 3,145,031 | A | * | 8/1964 | Wilkinson ............. | A01G 20/30 280/47.35 |
| 3,759,538 | A | * | 9/1973 | Fabiano ................. | A01G 20/30 280/47.35 |
| 4,880,248 | A | * | 11/1989 | Elmer ..................... | B25H 5/00 108/64 |
| 4,976,450 | A | * | 12/1990 | Ellefson .................. | A47F 5/05 108/103 |
| 5,318,315 | A | * | 6/1994 | White ..................... | B62B 1/10 280/47.18 |
| 5,390,944 | A | * | 2/1995 | Sherwin .................. | B62B 3/00 211/70.6 |
| 5,509,672 | A | * | 4/1996 | Offerson ................. | B25H 1/04 280/47.35 |
| 5,588,659 | A | * | 12/1996 | Boes ....................... | B25H 1/12 206/378 |

(Continued)

*Primary Examiner* — Jeffrey J Restifo
(74) *Attorney, Agent, or Firm* — Eversheds Sutherland (US) LLP

(57) ABSTRACT

A multipurpose utility cart for moving equipment and other cargo is provided. A utility cart includes a shelf defined by a rim surrounding the shelf. The rim has a u-shaped wall with at least one aperture formed in an upper surface thereof. The u-shaped wall and the at least one aperture define a channel for receiving an accessory. The utility cart has a handle coupled to the rim as well as a plurality of legs supporting the rim. The utility cart has a plurality of wheels such that the cart is manually propellable by a user exerting a force on the handle.

20 Claims, 10 Drawing Sheets

(56) References Cited

U.S. PATENT DOCUMENTS

| | | | | |
|---|---|---|---|---|
| 5,634,649 | A * | 6/1997 | Breining | B25H 1/04 280/47.35 |
| 5,887,878 | A * | 3/1999 | Tisbo | B62B 1/20 280/47.19 |
| 6,079,719 | A * | 6/2000 | Tisbo | B62B 3/006 280/47.19 |
| 6,179,306 | B1 * | 1/2001 | Maxwell | B62B 1/26 280/43.1 |
| D468,509 | S * | 1/2003 | Figueroa | B62B 3/104 D34/12 |
| 6,669,214 | B1 * | 12/2003 | Domis | B25H 3/00 280/47.19 |
| 6,823,998 | B2 * | 11/2004 | Fabregas | B25H 3/06 206/373 |
| 6,843,488 | B1 * | 1/2005 | Tseng | F16B 12/26 280/47.35 |
| 6,945,546 | B2 * | 9/2005 | Guirlinger | B25H 3/00 280/35 |
| 7,213,817 | B2 * | 5/2007 | Cheung | B62B 3/025 280/42 |
| 7,278,652 | B2 * | 10/2007 | Riedl | B62B 7/08 280/47.38 |
| 7,431,313 | B1 * | 10/2008 | Torres | B25H 3/00 280/124.12 |
| 7,677,591 | B2 * | 3/2010 | Chapman | B62B 1/12 280/47.23 |
| 7,845,656 | B2 * | 12/2010 | Thompson | B25H 3/00 280/47.35 |
| 8,109,526 | B2 * | 2/2012 | Mason | B62B 3/02 280/47.35 |
| 8,157,337 | B2 * | 4/2012 | Manalang | B25H 3/06 211/70.6 |
| D660,540 | S * | 5/2012 | Thompson | D34/17 |
| 8,322,732 | B2 * | 12/2012 | McKay | A47B 77/08 280/47.34 |
| 8,864,149 | B2 * | 10/2014 | Stryker | A61G 12/001 280/47.35 |
| 8,915,504 | B1 * | 12/2014 | Seibert | B62B 1/10 280/47.16 |
| 8,919,896 | B1 * | 12/2014 | Shewchuck | B25H 3/021 16/405 |
| 8,944,444 | B1 * | 2/2015 | Tvrdy | B62B 3/005 280/47.35 |
| 9,216,753 | B2 * | 12/2015 | Bryan | B62B 3/02 |
| 9,457,828 | B1 * | 10/2016 | Guirlinger | B62B 5/00 |
| 2003/0102644 | A1 * | 6/2003 | Figueroa | B62B 3/104 280/47.35 |
| 2006/0157946 | A1 * | 7/2006 | Stuemke | B62B 5/06 280/79.5 |
| 2006/0214384 | A1 * | 9/2006 | Gwin | A47L 13/51 280/79.5 |

* cited by examiner

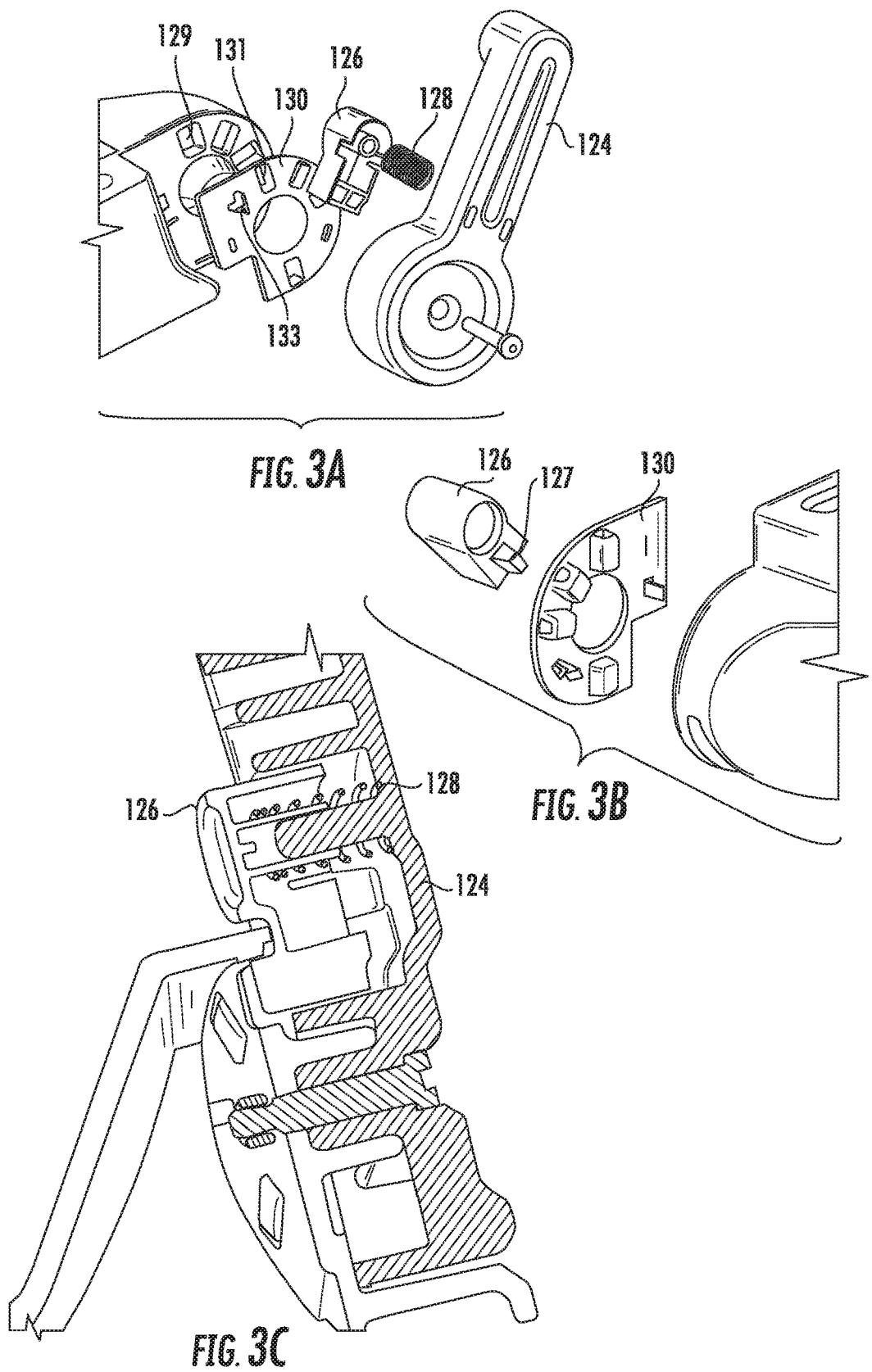

MULTIPURPOSE UTILITY CARTS

CROSS-REFERENCE TO RELATED APPLICATIONS

This application claims priority benefit of U.S. Provisional Application No. 62/412,737, filed on Oct. 25, 2016, which is incorporated by reference herein in its entirety.

BACKGROUND

The present disclosure relates generally to utility carts, and relates more particularly to utility carts having adaptable features.

Utility carts for manually transporting goods are generally limited in functionality. For example, traditional utility carts can provide a shelf surrounded by a raised lip with a rigid handle connected at one end. The flat surface of the shelf is difficult to utilize for projects in which a flat surface is required, due to the raised lip, and such carts experience issues in transporting oversized or bulky cargo.

SUMMARY

In one aspect, a multipurpose utility cart is provided, including a shelf defined by a rim surrounding the shelf. The rim of the utility cart has a u-shaped wall with at least one aperture formed in an upper surface thereof. The u-shaped wall and the at least one aperture define a channel for receiving an accessory. The utility cart has a handle coupled to the rim as well as a plurality of legs supporting the rim. The utility cart also includes a plurality of wheels configured such that a user exerting a force on the handle can manually propel the utility cart.

In another aspect, a multipurpose utility cart is provided, including a first shelf defined by a first rim surrounding the first shelf. The first rim of the utility cart has a u-shaped wall with at least one aperture formed in an upper surface thereof. The u-shaped wall and the at least one aperture define a channel for receiving an accessory. The utility cart has a second shelf defined by a second rim surrounding the second shelf. The second rim has at least one aperture formed in an upper surface thereof. A handle is coupled to the first rim of the first shelf. A plurality of legs supports the first shelf and is coupled to the second shelf. The utility cart includes a plurality of wheels configured such that a user exerting a force on the handle can manually propel the utility cart.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

FIG. 3A is an exploded view one embodiment of the handle support, push button, and handle support plate of a handle of a multipurpose utility cart.

FIG. 3B is an exploded view of one embodiment of the push button and handle support plate of a handle of a multipurpose utility cart.

FIG. 3C is a cross-sectional inside view of one embodiment of the handle support, push button, and handle support plate of a handle of a multipurpose utility cart.

DETAILED DESCRIPTION

Figure 1:
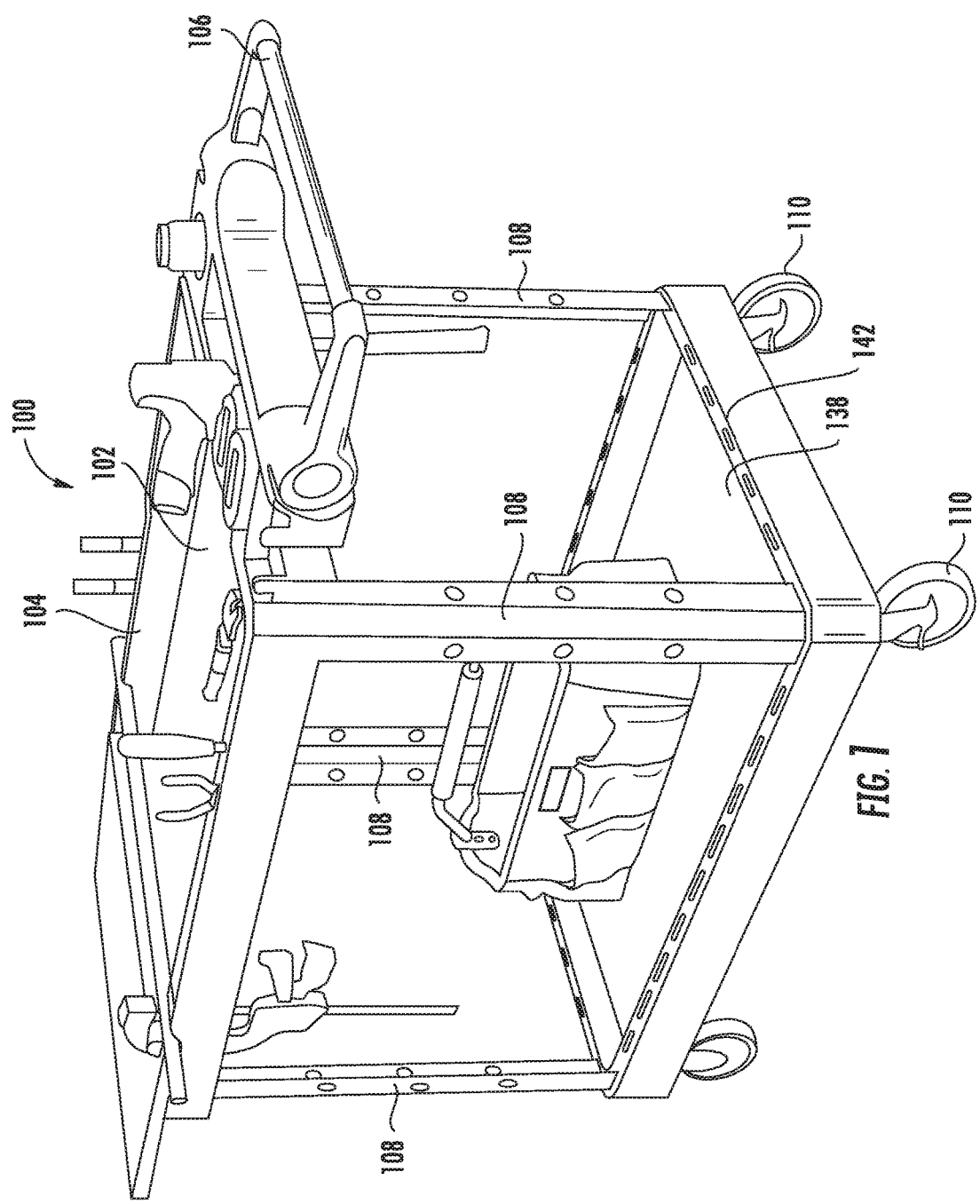
FIG. 1 is a perspective view of one embodiment of a multipurpose utility cart.

The present disclosure provides utility carts that are adaptable for multipurpose use. Accessories for and methods of using such utility carts are also provided. In certain embodiments, as shown in FIG. 1, a utility cart 100 includes a shelf 102 defined by a rim 104 surrounding the shelf 102, a handle 106 coupled to the rim 104, a plurality of legs 108 supporting the rim 104, and a plurality of wheels 110 configured such that the utility cart 100 is manually propellable by a user exerting a force on the handle 106. These multipurpose utility carts may have any of the features, or combinations of the features, described herein.

As used herein, the term "coupled" is used broadly and refers to components being directly or indirectly in contact with one another via any suitable fastening, connection, or attachment mechanism. Likewise, as used herein, the term "support" is used broadly and refers to components directly or indirectly providing a foundation for another component.

Figure 4A:
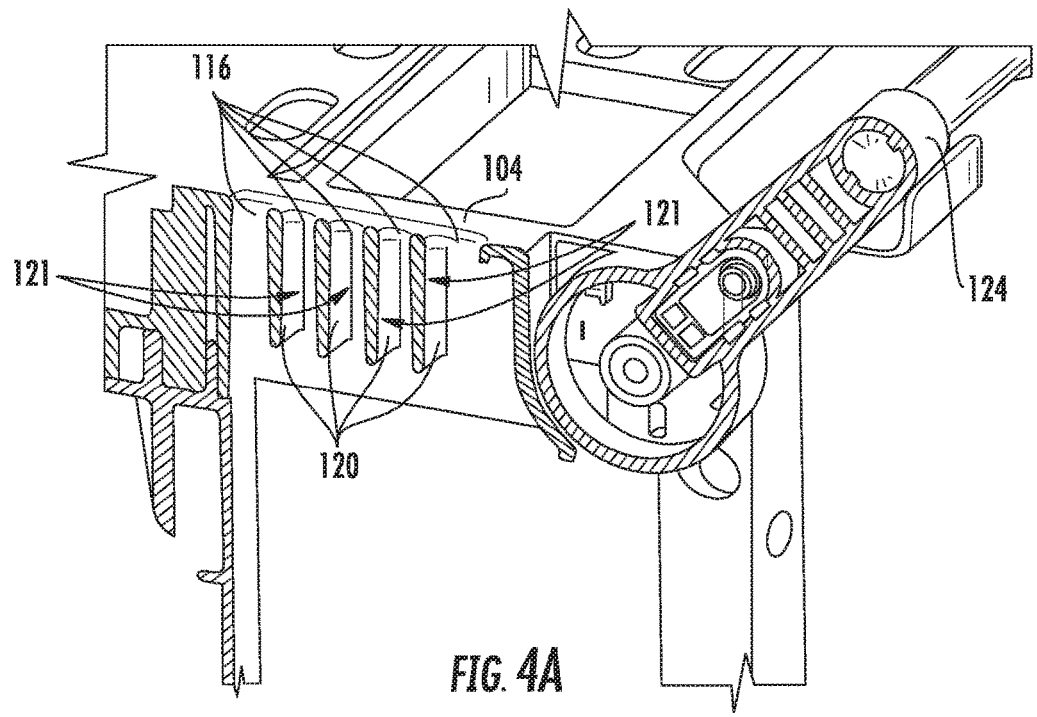
FIG. 4A is a cross-sectional view of one embodiment of the apertures and ribs of the rim of a multipurpose utility cart.
Figure 4B:
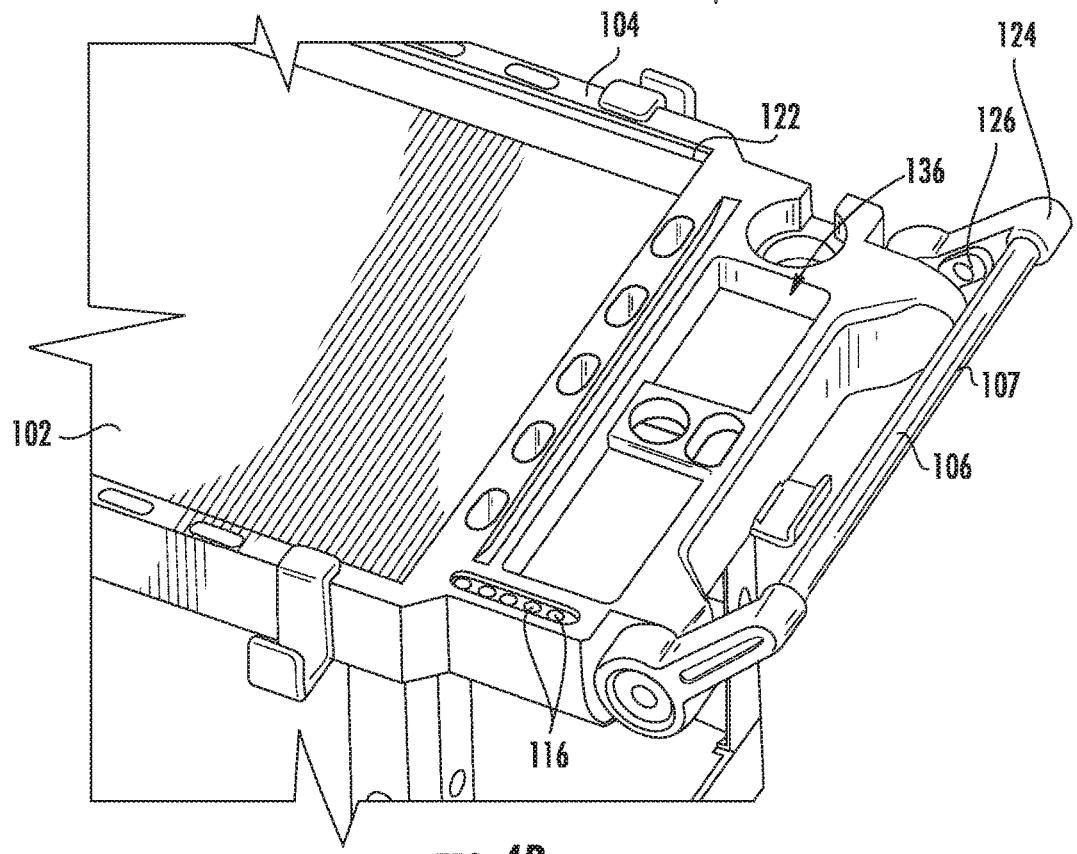
FIG. 4B is an upper perspective view of one embodiment of a multipurpose utility cart.
Figure 5A:
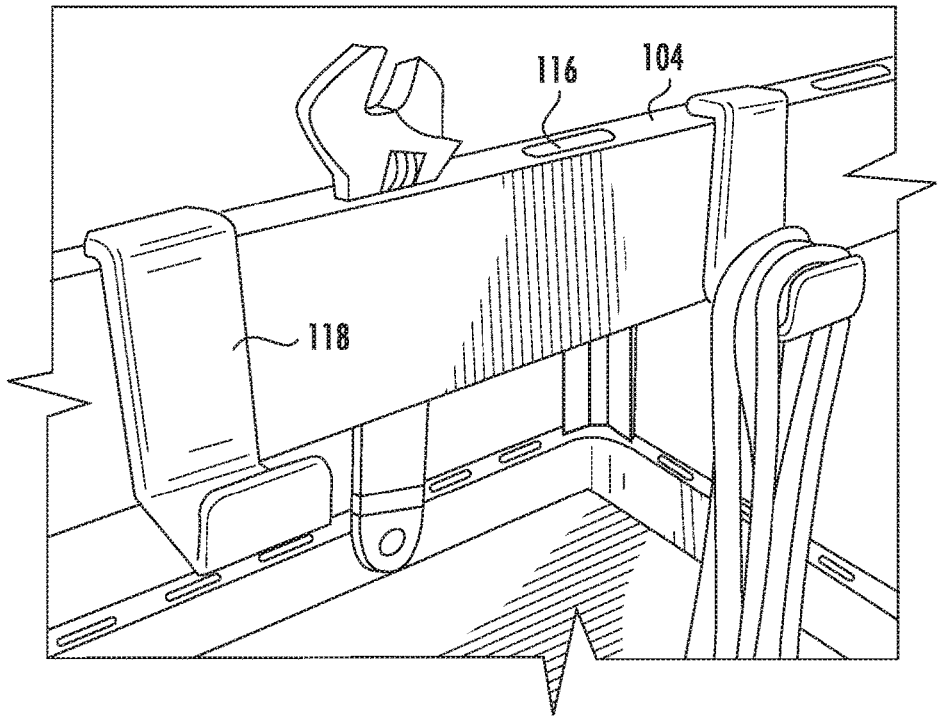
FIG. 5A is a side view of one embodiment of a hook and tool engaged within the apertures of the rim.
Figure 5B:
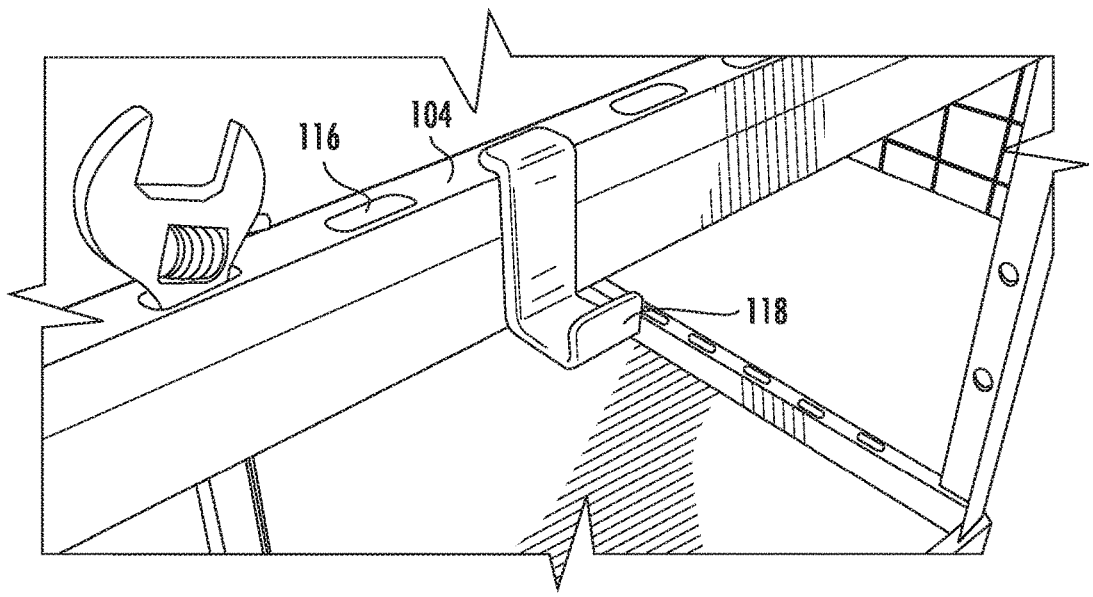
FIG. 5B is a side view of one embodiment of a hook and tool engaged within the apertures of the rim.
Figure 6A:
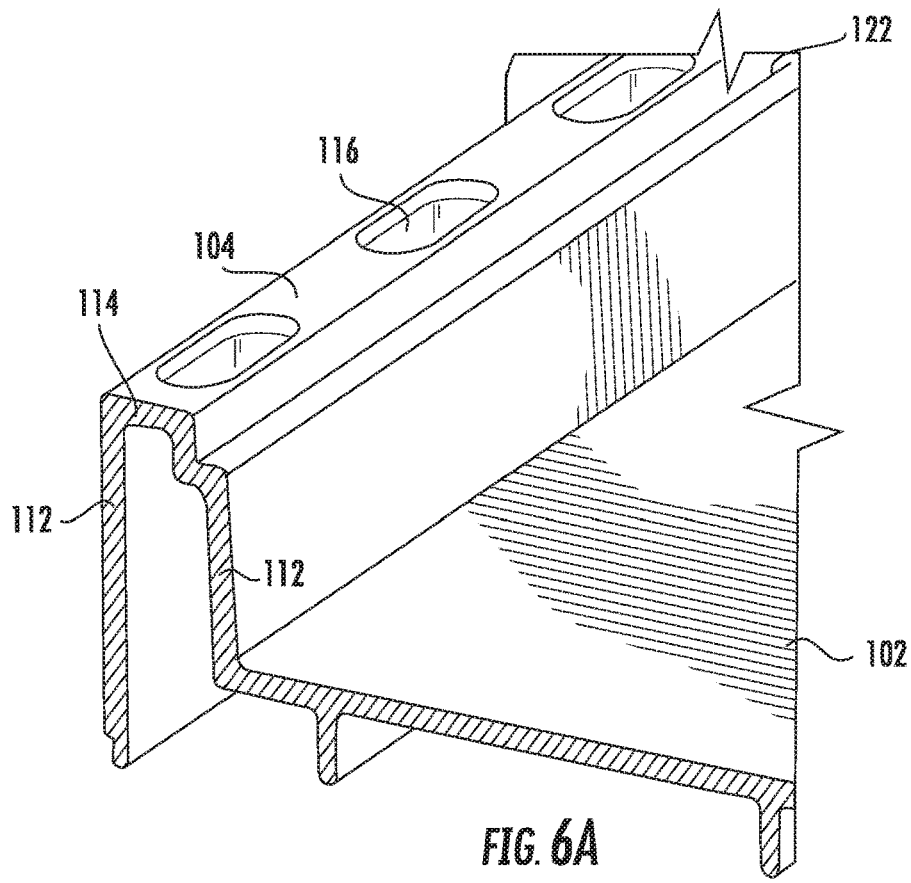
FIG. 6A is a cross-sectional view of one embodiment of the rim, u-shaped wall, notch, apertures, and channel of a multipurpose utility cart.
Figure 6B:
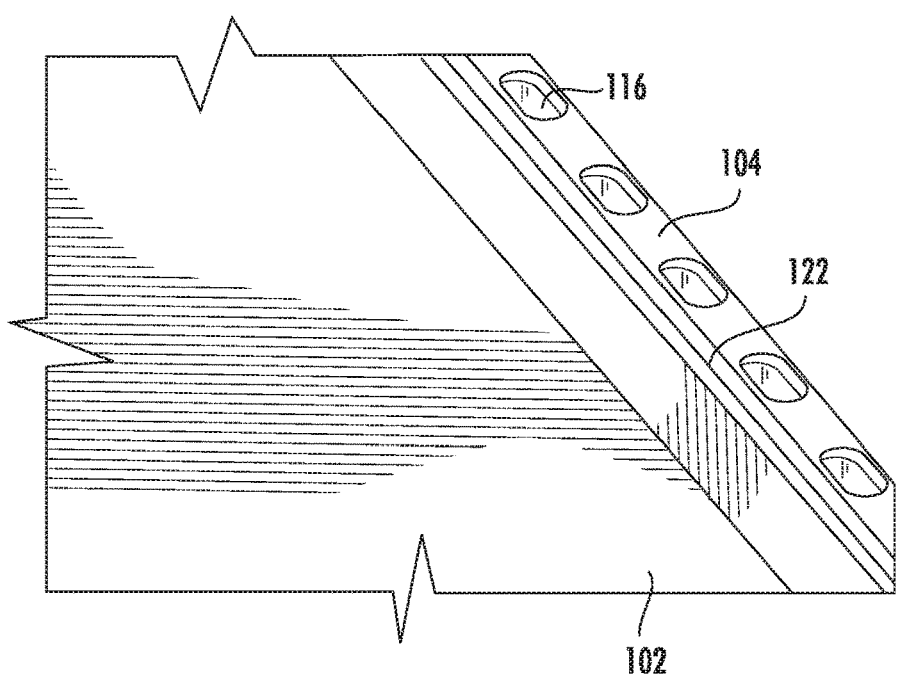
FIG. 6B is an upper perspective view of one embodiment of the rim, notch, and shelf of a multipurpose utility cart.

In some embodiments, as shown in FIGS. 1, 2, 4A, 4B, 5A, 5B, 6A, 6B, the rim 104 includes a u-shaped wall having at least one aperture formed in an upper surface thereof. As used herein, and shown by FIG. 6A, the term "u-shaped" refers generally to the rim 104 being formed at least by two substantially parallel sidewalls 112 and a substantially transverse upper wall 114 connecting (directly or indirectly) the two substantially parallel sidewalls 112, the transverse upper wall 114 at least partially forming the upper surface of the rim 104. FIGS. 6A and 6B show cross-sectional and internal views of the u-shaped wall forming the rim 104. For example, the upper surface of the rim 104 may be substantially parallel to the shelf 102 of the utility cart 100. The u-shaped wall and the aperture(s) 116 of the rim 104 together may define a channel for receiving an accessory, such as a hook, a rope or bungee cord, or an elongated portion of a tool (e.g., a hammer, wrench, screwdriver, pliers), as shown in FIGS. 1, 5A, and 5B.

Figure 8:
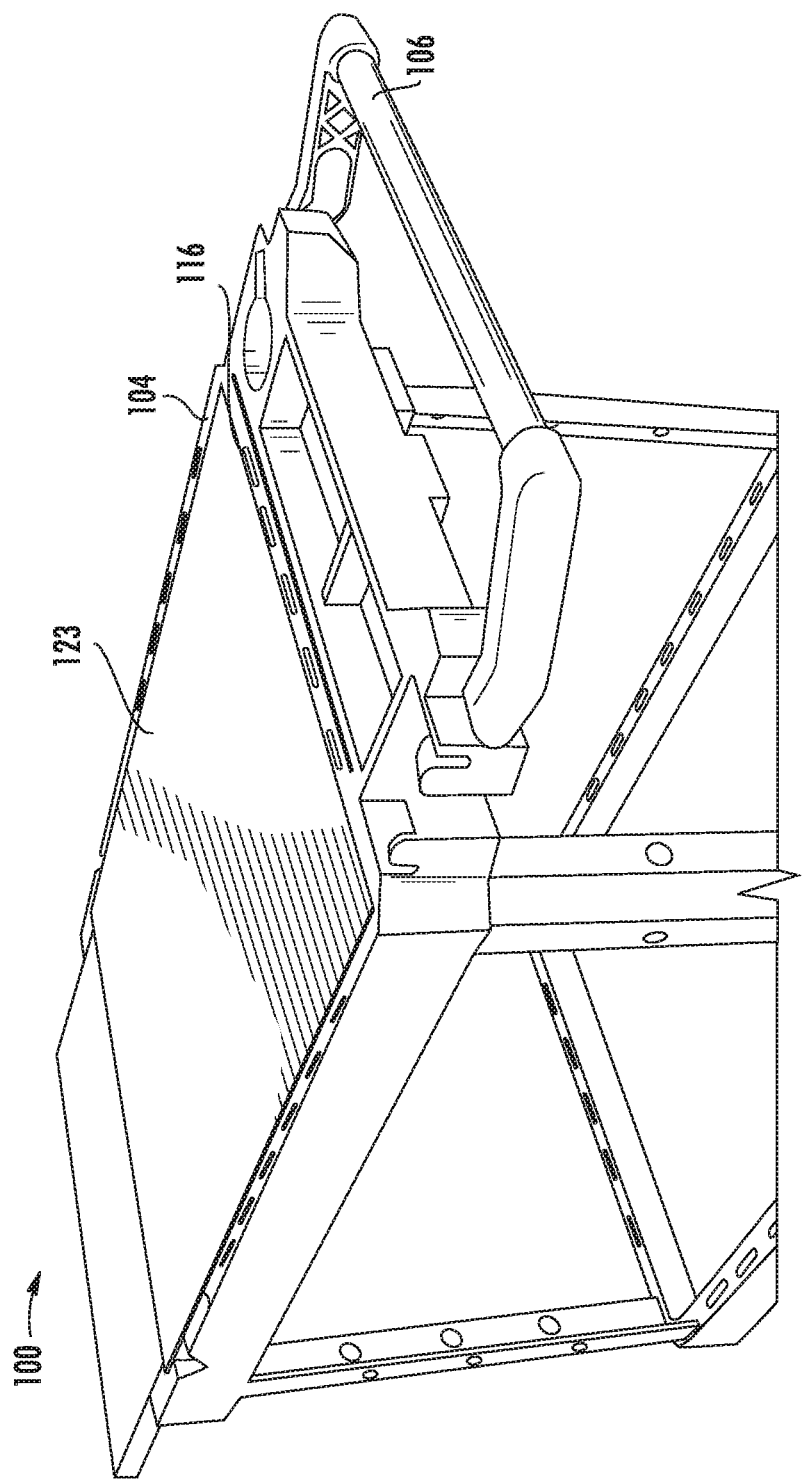
FIG. 8 is a perspective view of one embodiment of an accessory engaged with the notch on the rim of a utility cart.

The shelf 102 may be any suitable size and shape desired. In some embodiments, the shelf 102 is rectangular, for example with two shorter parallel sides and two longer parallel sides. For example, in such embodiments, the handle 106 may be coupled to the rim 104 defining one of the two shorter parallel sides, as shown in FIG. 8. In some embodiments, as shown in FIG. 8, at least one aperture 116 is formed in an upper surface of the rim 104 defining a side of the shelf having a length greater than another side of the shelf. For example, a plurality of apertures 116 may be formed in an upper surface of the rim 104 defining at least two sides of the shelf 102. In some embodiments, as shown in FIG. 8, a plurality of apertures 116 is formed in an upper surface of the rim defining at least three sides of the shelf (i.e., at least in the two longer sides and the side at which the handle 106 is coupled). In some embodiments, the apertures 116 are formed in an upper surface of the rim 104 defining four sides of the shelf 102. The apertures 116 may have any suitable size and shape (e.g., circular, elliptical, oval, rectangular).

Such apertures 116, as shown in FIGS. 5A, 5B 6A, and 6B, and the channels they define, provide adaptable storage for hand tools, tie downs (i.e., rope, bungee cords). Moreover, hooks 118 configured to securely fit within the channels of the utility cart 100 are further provided herein, as shown in FIGS. 5A and 5B. Such hooks 118 may provide movable hanging storage for cords, ropes, and other objects. In some embodiments, as shown in the internal perspective view of FIG. 4A, an inner surface of the u-shaped wall of the rim 104 includes at least one rib 120 adjacent the at least one aperture 116 (here five apertures and four ribs shown at a portion of the rim adjacent the handle) and extending in a direction transverse to the aperture 116. Such ribs 120 may extend from the apertures 116 to further define channels 121, which may secure and restrict lateral movement of an accessory in the channel.

In some embodiments, as shown in FIGS. 4B, 6A, and 6B, an outer surface of the u-shaped wall of the rim 104 includes a notch 122 adjacent the upper surface of the rim 104, the notch 122 having a notch surface parallel to the shelf 102. That is, the notch 122 may connect the internal (i.e., shelf facing) parallel sidewall of the u-shaped wall with the transverse upper wall of the u-shaped wall. Thus, the notch 122 may be formed at a portion of the rim 104 facing the shelf 102. In some embodiments, the notch 122 continuously extends along at least a portion of the rim 104 defining the shelf 102. For example, in embodiments in which the shelf 102 is rectangular in shape, the notch 122 may continuously extend along the rim 104 of at two opposed sides of the shelf 102. For example, in embodiments in which the shelf 102 is rectangular in shape, the notch 122 may continuously extend along the rim 104 of at three sides of the shelf 102. In some embodiments, the upper notch 122 continuously extends along substantially all or all of the rim 104 of the shelf 102.

For example, as shown in FIG. 8, the notch 122 (not shown) may extend fully along each of the longer sides of the shelf as well as along the side at which the handle 106 is coupled, to provide a mating surface for a rigid material (e.g., plastic, plywood, metal) insert 123 that creates a flush work surface in combination with the upper surfaces of the rim 104. That is, a user may convert the lipped shelf of FIG. 4B, which is useful for securely transporting goods that fit within the shelf, to the flat work surface of FIG. 8, which is useful for work requiring a stable flush surface and for transporting cargo that is longer than the cart. A planar insert accessory having the size and shape to nest in the notch 122 of the cart and provide a flush work surface is also provided herein. For example, the notch 122 may be sized to have a ½ inch depth, such that the material insert may likewise have a ½ inch thickness. Other suitable notch depths and thicknesses may also be used.

Figure 2:
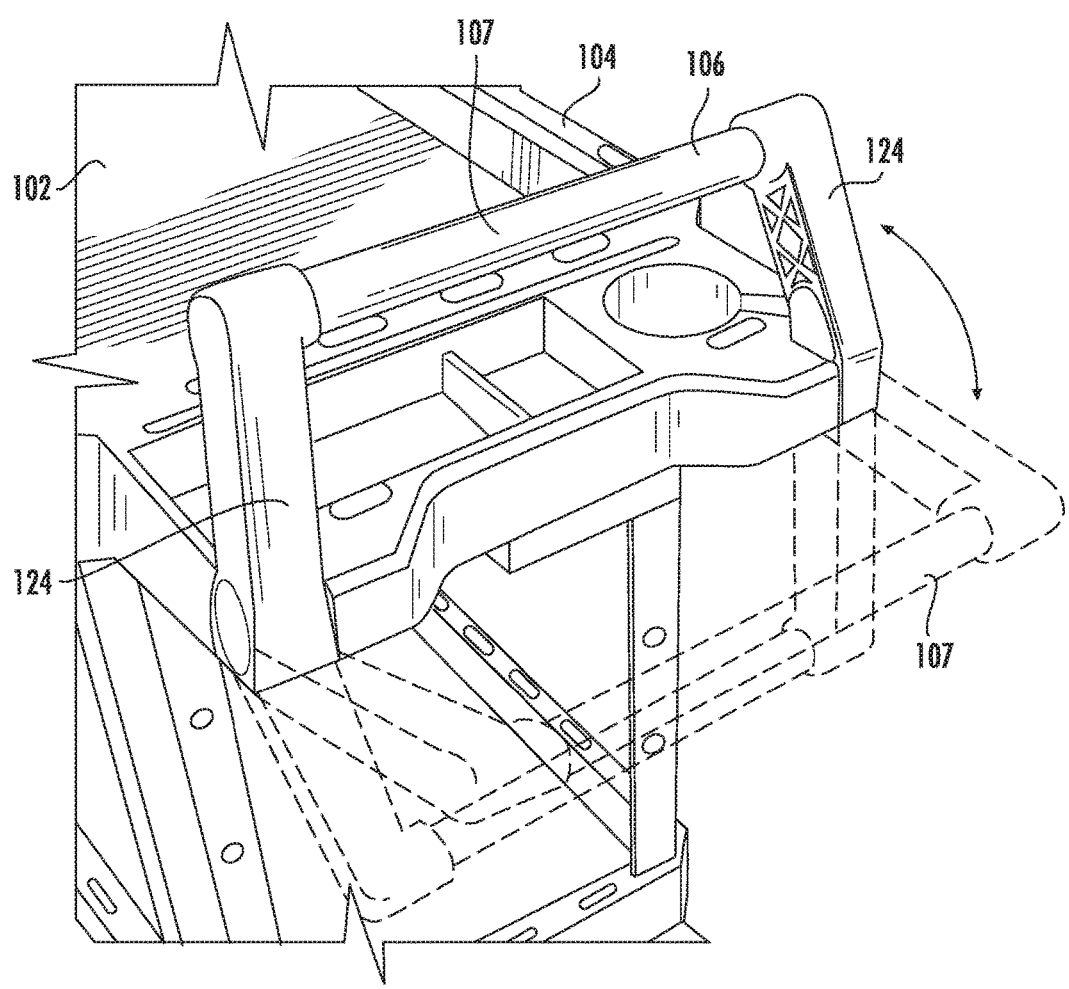
FIG. 2 is a perspective view of one embodiment of the pivoting handle of a multipurpose utility cart.

In certain embodiments, the handle 106 of the utility cart 100 includes an elongated bar 107 coupled to the rim 104 by at least one support 124. For example, as shown in FIG. 4B, the elongated bar 107 of the handle 106 is coupled to the rim 104 of the cart 100, which in this embodiment further includes an extended organization area 136, via two supports 124. In some embodiments, as shown in FIG. 2, the elongated bar 107 of the handle 106 is pivotable between a first position in which an upper surface of the handle 106 substantially shares a plane with the upper surface of the rim 104 and a second position. For example, FIG. 8 shows the handle 106 in the first position in which the upper facing surface of the handle is flush with the upper surface of the rim 104 of the cart 100. Such position may be useful for transporting cargo which overhangs the length of the cart 100. Moreover, in some embodiments, the handle may be configured to support a load when in the first position, such as a load of about 200 pounds.

In some embodiments, the handle 106 is also positionable in one or more additional locked positions (i.e., positions in which the handle is selectively securable). For example, as shown in FIG. 2, the handle 106 may be positionable in a position that is approximately 90 degrees rotated from the first position, toward the upper surface of the shelf 102. Such position may be useful for transporting heavy cargo securely on the shelf 102 by manually pushing the handle 106, for example. For example, as shown in FIG. 4B, the handle may be positionable in a position that is between the first position and the approximate 90 degree position described above, for example at about 45 degrees rotated from the first position, toward the upper surface of the shelf. Such position may provide an ergonomic option useful for transporting cargo securely on the shelf by manually pushing the handle 106, for example. In some embodiments, the handle 106 is further positionable in a position that is positioned about 90 degrees rotated from the first position, toward the lower surface of the shelf 102. Such position may provide a storage position in which the handle 106 is efficiently stowed.

In certain embodiments, as shown in FIGS. 2, 3A-3C, 4A, and 4B, the handle 106 and/or the at least one support 124 includes a spring-loaded push button 126 configured to allow a user to manually pivot the handle 106 between the locked positions upon depression of the push button 126. As shown in FIGS. 3A-3C, in some embodiments, the push button 126 is disposed in one or both of the supports 124 coupled to the handle 106. The supports 124 are coupled to the rim 104 of the cart 100 (shown with an extended compartmented organization zone 136 in FIGS. 2, 4A, and 4B). For example, the push button 126 may include an integral feature that orients and locks the handle 106 into the user-selected position. For example, as shown in FIGS. 3A-3C, the spring-loaded button 126 is nested into the support 124 of the handle 106 and includes a projection 127 configured to mate with at least two corresponding recesses 129 disposed at the rim 104 of the cart 100 (or an extension thereof). The number of recesses 129 may correspond to the number of positions in which the handle 106 may be locked. For example, a user may depress the button 126, via a compression spring 128, such that the projection 127 of the button 126 is movable between the two or more positions, to securely lock the handle 106 in a selected position.

In some embodiments, as shown in FIGS. 3A-3C, the support 124 further includes a reinforced handle support plate 130 that overlays the portion of the cart 100 in which the recesses 129 are disposed and provides additional strength at the pivot area. The handle support plate 130 may likewise provide at least two corresponding recesses 131 in which the projection 127 of the button may be positioned. The handle support 124, as shown in FIGS. 3A and 3B, may also include an integral stop 133 that prevents pivoting of the handle 106 past the vertical position (i.e., the position about 90 degrees from the first position). In some embodiments, the reinforced handle support plate 130 strengthens the pivot area of the handle 106 so that in the first position, the handle 106 can withstand a load of up to, for example, about 200 pounds or more.

Figure 7A:
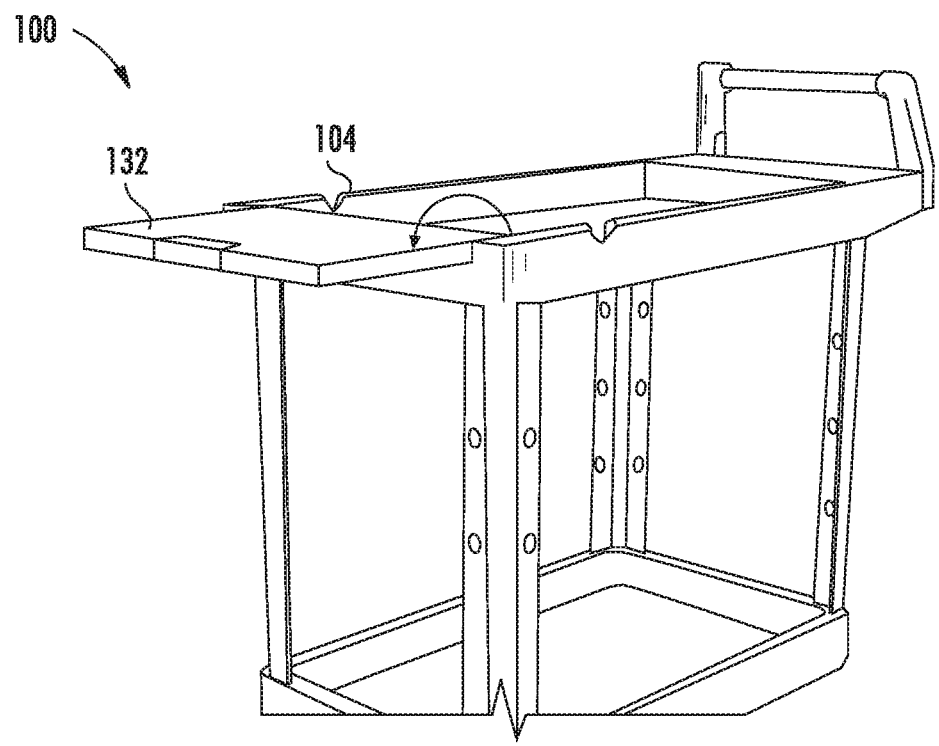
FIG. 7A is a perspective view of one embodiment of the pivotable shelf in a first position.
Figure 7B:
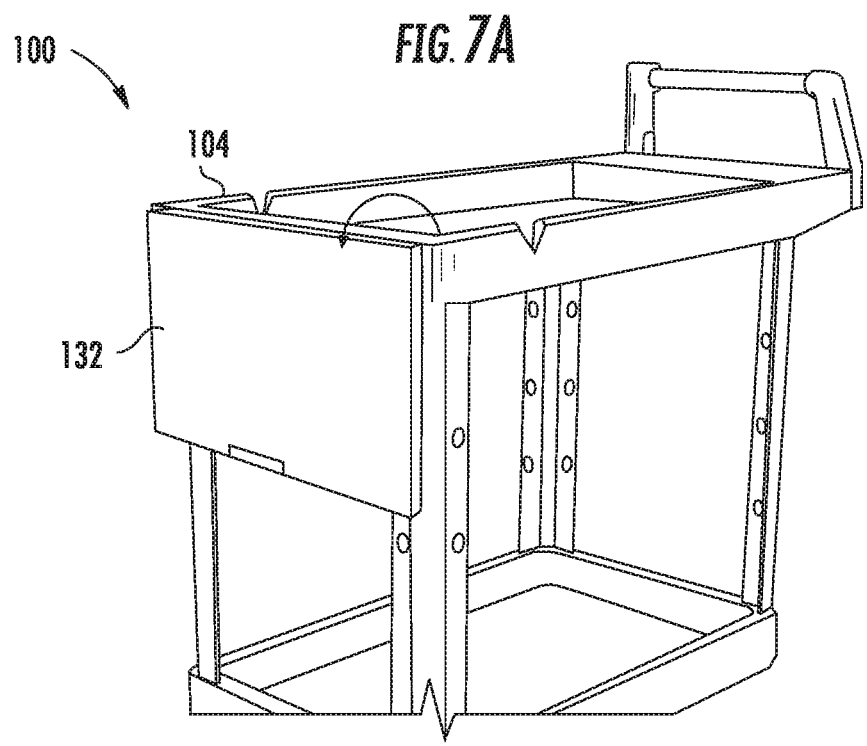
FIG. 7B is a perspective view of one embodiment of the pivotable shelf in a second position.

In some embodiments, as shown in FIGS. 7A and 7B, the utility cart 100 further includes a pivotable shelf 132 coupled to a portion of the rim 104 opposite the handle 106, the pivotable shelf 132 being pivotable between a first position in which an upper surface of the pivotable shelf 132 substantially shares a plane with the upper surface of the rim 104 and a second position. For example, the pivotable shelf 132 may be configured to move between two positions, a use position and a storage position, via a user manually pivoting the shelf into the locked use position. In the locked use position, the pivotable shelf 132 may provide a flush surface with the upper surface of the rim 104 of the cart 100 and the upper surface of the handle 106 when positioned in its first position, to provide a large flat work surface. In some embodiments, the pivotable shelf 132 is removable by a user without tools.

Figure 9:
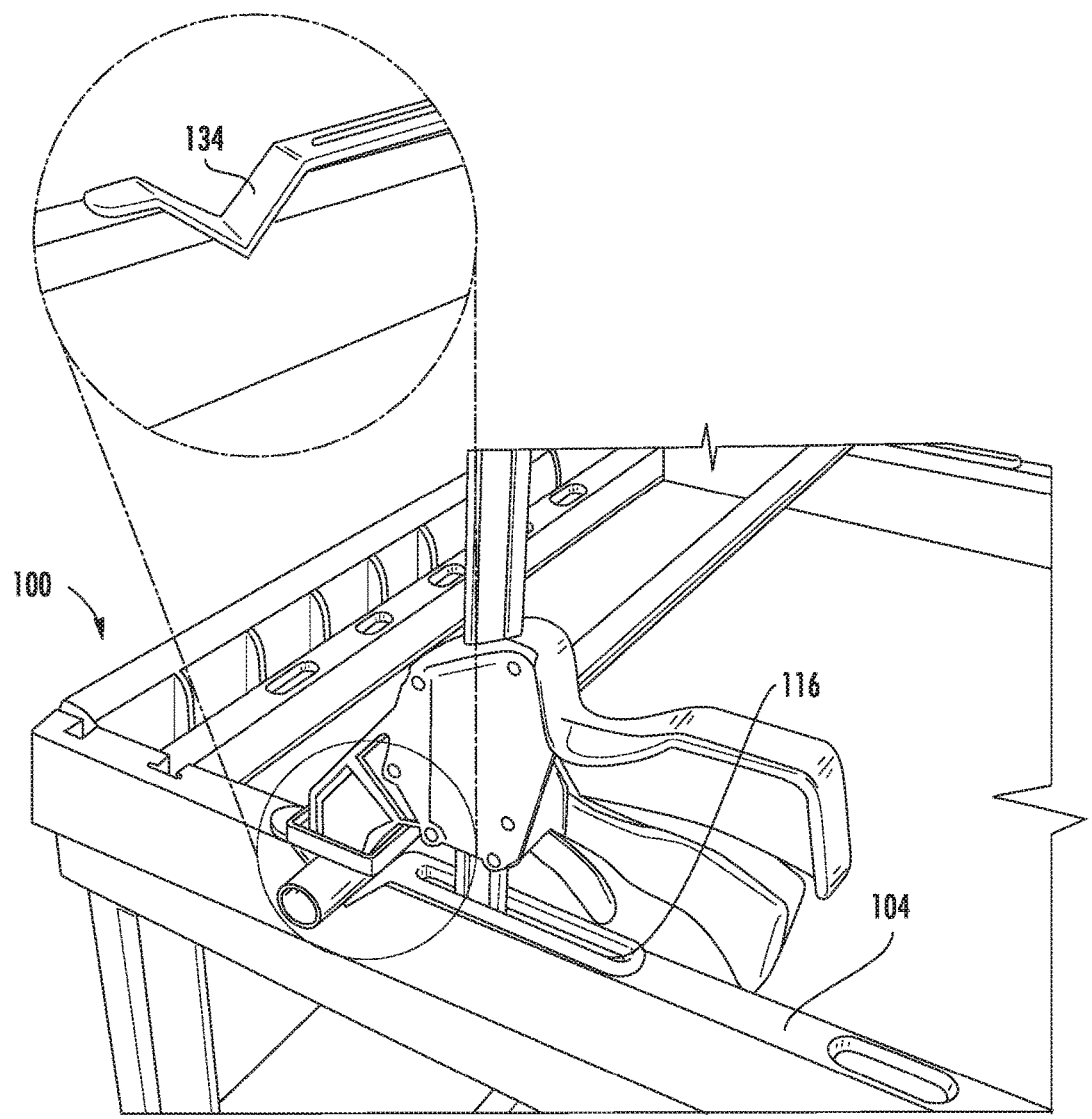
FIG. 9 is a perspective view of one embodiment of a multipurpose utility cart having a pipe notch.

In certain embodiments, as shown in FIG. 9, the rim 104 of the cart 100 includes a pipe notch 134 forming a channel between an inner surface of the rim 104 facing the shelf an opposed outer surface of the rim 104, the notch 134 being sized and shaped to receive a pipe. For example, the pipe notch 134 may be a v-shaped or u-shaped notch. The pipe notch 134 may include a material reinforcement that overlays the portion of the rim defining the pipe notch 134. In some embodiments, as shown in FIG. 9, the pipe notch 134 is positioned adjacent the at least one aperture 116. For example, the material reinforcement may also overlay the portion of the rim defining the aperture 116 adjacent the pipe notch 134. For example, the aperture 116 adjacent the pipe notch 134 may allow the user to install a clamp adjacent the pipe notch 134, to secure an item in the pipe notch 134, such as for cutting or working operations. For example, a clamp may also be installed in an aperture 116 and used to secure flat objects that are not positioned within the pipe notch 134, such as a board, to the rim 104 of the cart 100. For example, a user may detach the removable jaws of a suitable clamp (such as a bar clamp, as shown in FIG. 9) and place the bar through the slot provided, to secure the clamp therein.

In certain embodiments, as shown in FIG. 4B, the rim 104 includes an extended organization area 136 in addition to the u-shaped wall defining the shelf 102 at the side of the shelf at which the handle 106 is coupled. For example, the extended organization area 136 may provide storage compartments for loose objects (e.g., fasteners) and additional apertures defining channels for storing tools or other accessories. The apertures in the extended organization area may be of any suitable size and shape, and may be smaller and/or larger than the apertures otherwise positioned about the rim of the cart.

Figure 13A:
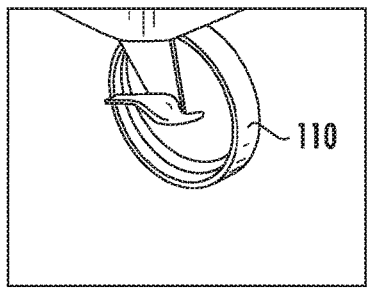
FIG. 13A is a perspective view of one embodiment of a wheel of a multipurpose utility cart.
Figure 13B:
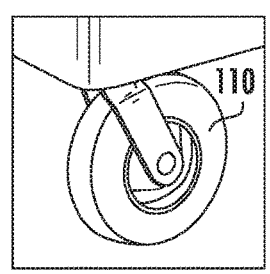
FIG. 13B is a perspective view of one embodiment of a wheel of a multipurpose utility cart.
Figure 13C:
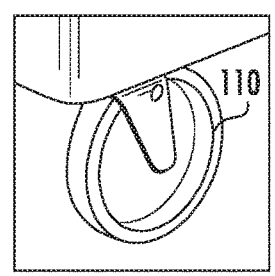
FIG. 13C is a perspective view of one embodiment of a wheel of a multipurpose utility cart.

Any suitable wheels 110 (e.g., casters) may be used in the presently described utility carts, such as those shown in FIGS. 13A-13C. For example, locking casters may be used to allow the user to secure the cart and prevent unwanted motion during use. For example, pneumatic casters may be used to provide a cushioned and quiet ride for fragile loads, for smooth or rough surfaces, inside and out. For example, thermoplastic rubber (TPR) casters may be used to absorb shock and provide floor surface protection and quiet operation on linoleum, tile, terrazzo, wood, smooth concrete, and carpet.

Figure 10:
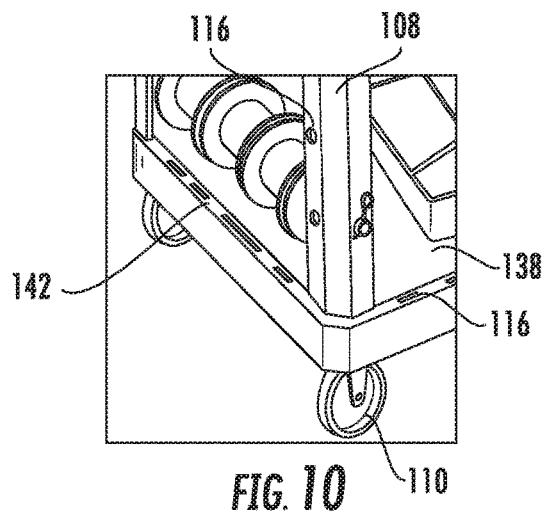
FIG. 10 is a perspective view of one embodiment of the bottom shelf and plurality of wheels of a multipurpose utility cart.

In certain embodiments, as shown in FIG. 10, the legs 108 of the cart may include apertures 109 therethrough, such as to provide storage for wire spools and other rolled goods as well as additional tie down locations.

Figure 12:
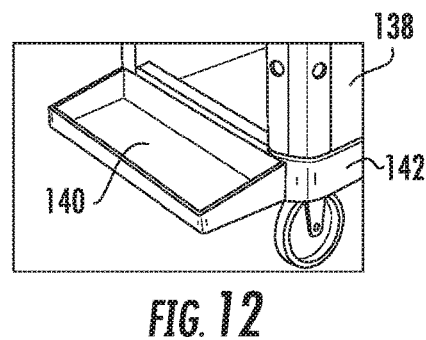
FIG. 12 is a perspective view of one embodiment of a base shelf of a multipurpose utility cart.

In certain embodiments, as shown in FIG. 1, the cart 100 may also include a bottom (e.g., second) shelf 138 defined by a second rim 142. In some embodiments, the rim 142 defining the bottom shelf 138 may have apertures 116 similar to those described with respect to the rim 104 of the upper first shelf 138. For example, the apertures 116 of the bottom rim 142 may likewise provide for secure attachment of accessories, such as a base overhang shelf as shown in FIG. 12. For example, as shown in FIG. 12, the base shelf 140 may provide an extension of the bottom shelf 138 that allows for the secure transport of a ladder or other tall item that is positioned on the shelf extension. In addition, a base shelf 140 configured to securely attach to the apertures 116 of the rim 142 of the bottom shelf 138 is also provided.

Figure 11:
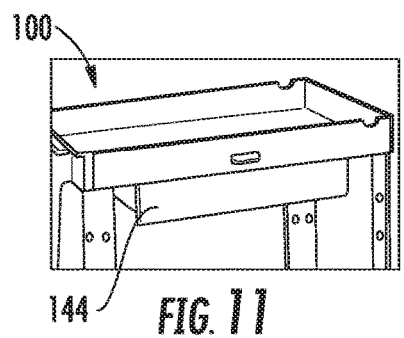
FIG. 11 is a perspective view of one embodiment of the slidable drawer of a multipurpose utility cart.

In certain embodiments, as shown in FIG. 11, the utility cart 100 further includes a slidable drawer 144.

The utility carts 100 described herein may have any suitable size, shape, and design for the particular use. For example, the utility carts may have about 500 pound capacity. For example, the upper surface of the carts (including the handle portion, but not the pivotable shelf) may be approximately 49 inches by 28 inches, or approximately 43 inches by 20 inches, for example.

The utility carts may be formed from any suitable material, including resins, such as polypropylene and polyethylene resins, metals, such as stainless steel, and combinations thereof.

In certain embodiments, accessories for utility carts 100 described herein are also provided. For example, hooks 118 that are sized and shaped to fit in the channels of the rim 104 are provided, as shown in FIGS. 5A and 5B. Inserts 123 sized and shaped to be positioned in the notch 122 of the rim 104, for converting the lipped cart to a flat work surface, are also provided. In addition, as shown in FIG. 12, a base shelf 140 configured to securely attach to the apertures 116 of the rim 142 of the bottom shelf 138 is also provided.

In certain embodiments, methods of using a utility cart, including using the features described herein and/or converting the utility cart between its positions are also provided herein.

Overall, the presently described utility carts provide improved flexibility and adaptability including providing a transformable flat or lipped work surface, various tool/accessory organization and storage options, and the ability to transport oversized and bulky objects that known carts cannot transport and/or secure. Moreover, the present utility carts provide customizable storage and usage.

While the disclosure has been described with reference to a number of embodiments, it will be understood by those skilled in the art that the disclosure is not limited to such disclosed embodiments. Rather, the disclosed embodiments can be modified to incorporate any number of variations, alterations, substitutions, or equivalent arrangements not described herein, but which are commensurate with the scope of the disclosure.

What is claimed is:

1. A utility cart, comprising:
   a shelf defined by a rim extending perpendicularly from the shelf, the rim comprising a u-shaped wall disposed on at least two sides of the shelf, the u-shaped wall comprising at least two parallel sidewalls and a transverse upper wall connecting the two parallel sidewalls, the transverse upper wall comprising at least one aperture formed in an upper surface thereof, wherein the at least one aperture and the u-shaped wall define a channel for receiving an accessory;
   a handle coupled to the rim;
   a plurality of legs supporting the rim; and
   a plurality of wheels configured such that the utility cart is manually propellable by a user exerting a force on the handle.

2. The utility cart of claim 1, wherein the shelf is rectangular in shape and the at least one aperture is formed in an upper surface of the rim defining a side of the shelf having a length greater than another side of the shelf.

3. The utility cart of claim 1, wherein the shelf is rectangular in shape and the utility cart comprises a plurality of the apertures formed in an upper surface of the rim defining at least two sides of the shelf.

4. The utility cart of claim 1, wherein an inner surface of the u-shaped wall of the rim comprises at least one rib adjacent the at least one aperture and extending in a direction transverse to the aperture.

5. The utility cart of claim 1, wherein:
   an outer surface of the u-shaped wall of the rim comprises a notch adjacent the upper surface of the rim, the notch comprising a first surface parallel to the shelf and a second surface transverse to the first surface, and
   the notch is formed at a portion of the rim facing the shelf.

6. The utility cart of claim 5, wherein the shelf is rectangular in shape and the notch continuously extends along the rim at three sides of the shelf.

7. The utility cart of claim 1, wherein:
   the handle comprises an elongated bar coupled to the rim by at least one support, and
   the elongated bar of the handle is pivotable between a first position in which an upper surface of the handle substantially shares a plane with the upper surface of the rim and a second position.

8. The utility cart of claim 7, wherein, in the first position, the handle is configured to support a 200 pound load.

9. The utility cart of claim 7, wherein the handle and/or the at least one support comprises a spring-loaded push button configured to allow a user to manually pivot the handle between positions upon depression of the push button.

10. The utility cart of claim 9, wherein the push button comprises a projection configured to mate with at least two recesses of a reinforced handle support plate.

11. The utility cart of claim 1, wherein a pivotable shelf is coupled to a portion of the rim opposite the handle, the pivotable shelf being pivotable between a first position in which an upper surface of the pivotable shelf substantially shares a plane with the upper surface of the rim and a second position.

12. The utility cart of claim 1, wherein the rim comprises a pipe notch forming a channel between an outer surface of the rim facing the shelf an opposed outer surface of the rim, the notch being sized and shaped to receive a pipe.

13. The utility cart of claim 12, wherein the pipe notch is positioned adjacent the at least one aperture.

14. The utility cart of claim 1, wherein at least one of the plurality of legs has at least one aperture extending laterally therethrough.

15. The utility cart of claim 1, wherein the rim comprises an extended organizational area coupled to the handle.

16. A utility cart, comprising:
   a first shelf defined by a first rim extending perpendicularly from the first shelf, the first rim comprising a u-shaped wall disposed on at least two sides of the first shelf, the u-shaped wall comprising at least one aperture formed in an upper surface thereof, wherein the u-shaped wall and the at least one aperture define a channel for receiving an accessory;
   a second shelf defined by a second rim surrounding the second shelf, the second rim having at least one aperture formed in an upper surface thereof;
   a handle coupled to the first rim;
   a plurality of legs supporting the first shelf and coupled to the second shelf; and
   a plurality of wheels configured such that the utility cart is manually propellable by a user exerting a force on the handle.

17. The utility cart of claim 16, wherein the first shelf is positioned above the second shelf.

18. The utility cart of claim 16, wherein the first shelf is rectangular in shape and the at least one aperture is formed in an upper surface of the first rim defining a side of the first shelf having a length greater than another side of the first shelf.

19. The utility cart of claim 16, wherein the second shelf is rectangular in shape and the at least one aperture is formed in an upper surface of the second rim defining a side of the second shelf having a length greater than another side of the second shelf.

20. The utility cart of claim 16, wherein the first rim comprises an extended organizational area coupled to the handle.

* * * * *